Oct. 11, 1927.
F. REMY
1,644,792
PRESSURE AND SUCTION DISTRIBUTING MECHANISM
Filed Jan. 9, 1926    2 Sheets-Sheet 1
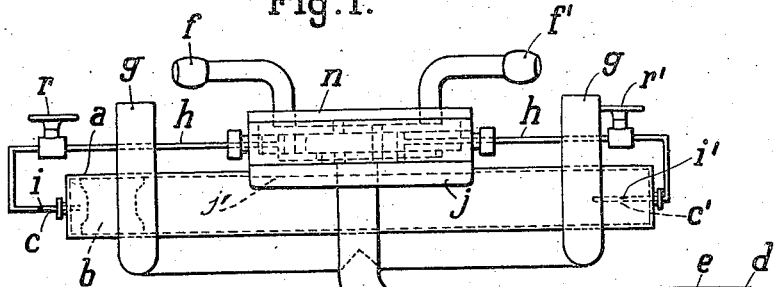
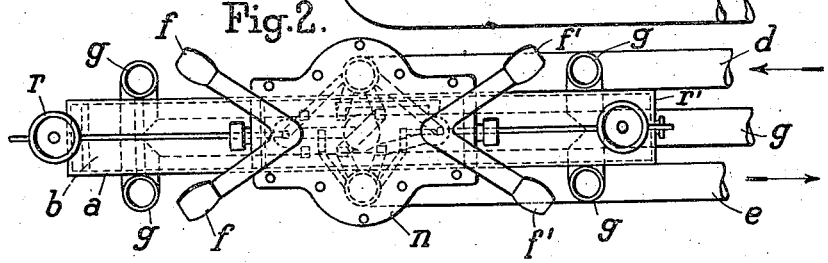
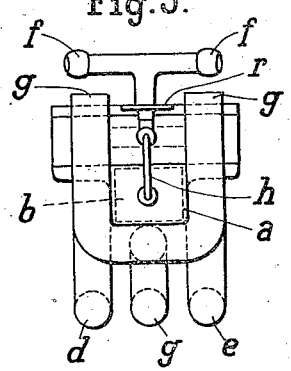
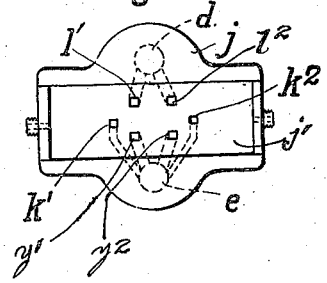
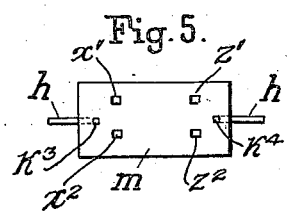
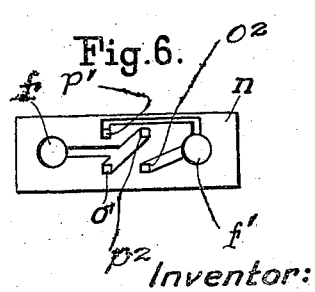
Inventor:
Franz Remy Patented Oct. 11, 1927.

1,644,792

UNITED STATES PATENT OFFICE.

FRANZ REMY, OF FOSSES-LEZ-NAMUR, BELGIUM.

PRESSURE AND SUCTION DISTRIBUTING MECHANISM.

Application filed January 9, 1926, Serial No. 80,329, and in Belgium January 16, 1925.

This invention relates to milking machines and more particularly to pulsators or pressure and suction distributing devices therefor.

The principal object of the invention is to provide an improved pulsator for distributing pressure and suction to the milking cups in such a manner that periods in which suction is applied to the front milking cups and pressure to the rear milking cups alternate with periods during which pressure is applied to the front milking cups and suction to the rear milking cups the flexible suction elements in the milking cups being supplied with suction continuously.

A further object of the invention is to provide improved and simplified valve mechanism for controlling the pressure and suction distribution operated automatically by a piston working in a cylinder which is connected to suction alternately at opposite ends by movements of the valve, the movements of the valve being regulable by means of regulating valves in the suction connections to the cylinder to vary the frequency of the pressure and suction impulses which are transmitted to the milking cups.

With these and other objects in view the invention consists in the improved construction hereinafter described and claimed.

In the accompanying drawings:—

Figure 1 is a side elevation of the pulsator,

Figure 2 is a plan view of the same,

Figure 3 is an end elevation,

Figure 4 is a detail view of the distribution box with the cover and slide removed, Figure 5 is a detail view of the slide, Figure 6 is a detail view showing the ports in the distribution box cover.

Figure 7:
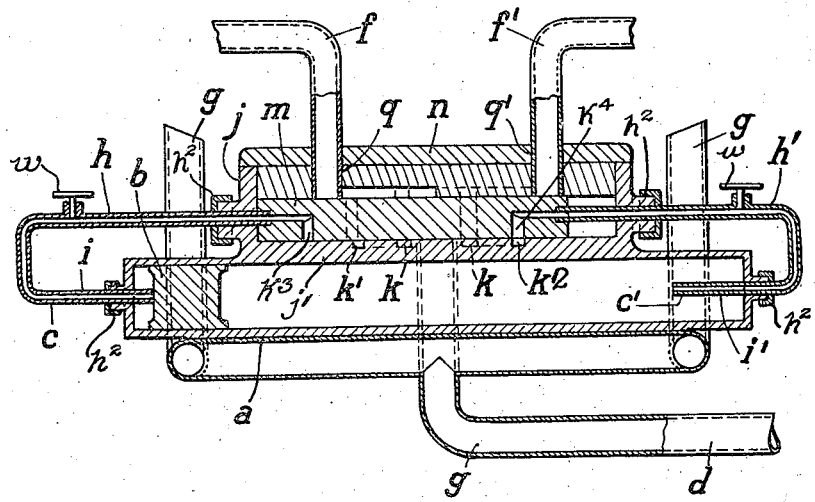
Figure 7 is a longitudinal section of the pulsator, and, Figure 8 is a transverse section thereof.
Figure 8:
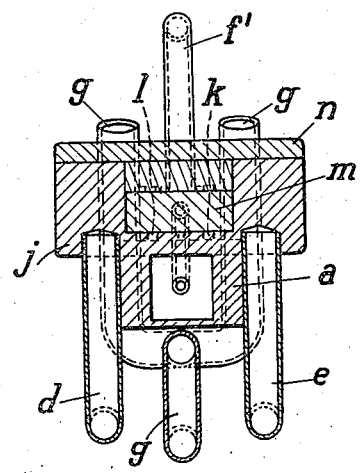

As shown in the drawings the pulsator comprises a distribution box $j$ which is formed in one piece with a cylinder $a$ containing a piston $b$ which slides freely in the cylinder and is adapted to act on the ends of two U-shaped tubes $h$, $h'$ which project through stuffing boxes $h^2$ in the opposite ends of the cylinder and are free to slide in said stuffing boxes. The tubes $h$, $h^1$ also project through stuffing boxes $h^2$ in opposite ends of the distribution box $j$ and are connected at their ends to the opposite ends of a ported slide $m$ working in the distribution box and adapted to be reciprocated longitudinally by the movement of the piston $b$ acting through the tubes $h$, $h^1$.

The distribution box $j$ carries a conduit $d$ adapted to be connected to any suitable compressed air vessel and a conduit $e$ adapted to be connected to any suitable suction vessel. The lower wall $j^1$ of the distribution box is formed with a pair of port openings $k^1$, $k^2$ disposed in line with the axis of the slide $m$ as best shown in Figure 4 and with two pairs of ports $l^1$, $l^2$ and $y^1$, $y^2$ disposed on opposite sides of the axis of the slide, the ports $k^1$, $k^2$, $y^1$, $y^2$ being connected to the suction conduit $e$ whilst the ports $l^1$, $l^2$ are connected to the pressure conduit $d$.

The distribution box $j$ is provided with a cover $n$ which carries two pairs of nipples $f$, $f'$ and is formed on its lower surface with a pair of ports $p^1$, $p^2$ which register with the ports $y^1$, $y^2$ in the distribution box and with a pair of ports $o^1$, $o^2$ which register with the ports $l^1$, $l^2$ in the distribution box, the ports $p^1$, $o^2$ being connected to the nipples $f'$ whilst the ports $p^2$, $o^1$ are connected with the nipples $f$ shown in Figure 6 which is a bottom plan view of the cover $n$.

The slide $m$ is provided with two pairs of ports $x^1$, $x^2$ and $z^1$, $z^2$ which cooperate with the ports $l^1$, $l^2$, $y^1$, $y^2$, $p^1$, $p^2$, $o^1$, $o^2$ and which are so disposed that when the slide $m$ is in the position shown in Figure 7 the ports $z^1$, $z^2$ register with the ports $l^2$, $y^2$ and $o^2$, $p^2$ thus putting the nipples $f'$ into communication with the pressure conduit $d$ through the ports $o^2$, $z^1$, $l^2$ and the nipples $f$ into communication with the suction conduit $e$ through the ports $p^2$, $z^2$, $y^2$ whilst when the slide $m$ is moved to the opposite position to that shown in Figure 7 (i. e. to the position in which it abuts the right hand end wall of the distribution box $j$ as seen in Figure 7) the port $x^1$, $x^2$ registers with the ports $l^1$, $y^1$ and $o^1$, $p^1$ thus putting the nipples $f'$ into communication with the suction conduit $e$ and the nipples $f$ with the pressure conduit $d$. The nipples $f$ and $f'$ are thus alternately connected to pressure and suction when the slide $m$ is reciprocated, the nipples $f$ being connected to the pressure whilst the nipples $f'$ connected to suction and vice versa.

In order to operate the piston $b$ the tubes $h$, $h'$ are connected to ports $k^3$, $k^4$ in the slide $m$ which cooperate with the ports $k^1$, $k^2$ in the distribution box and are so disposed that when the slide $m$ is in the position shown in Figure 7 the tube $h'$ is connected through the ports $k^4$, $k^2$ to the suction conduit $e$ whilst when the slide is in the opposite position (i. e. in the position in which it abuts the right hand end of the distribution box as seen in Figure 7) the tube $h^1$ communicates through the ports $k^3$, $k^1$ with the suction conduit $e$. The cylinder $a$ is thus connected to suction alternately on opposite sides of the piston $b$ so that the piston reciprocates in the cylinder and moves the slide $m$ by acting on the ends of the tubes $h$, $h^1$. In order to admit air to the cylinder at the side of the piston opposite to that at which suction is applied the tubes $h$, $h^1$ are provided with openings $i$, $i^1$, which are disposed within the cylinder when the tube is in its innermost position but which pass through the stuffing box and communicate with the atmosphere so as to admit air to the cylinder when the tube is pushed in the outward direction by the action of the piston $b$.

Regulating valves $w$ are provided in the tubes $h$, $h^1$ in order that the supply of suction to the cylinder may be regulated to control the speed of the piston.

In operation, the nipples $f$ are connected by means of the usual flexible connections which form no part of the present invention to the front milking cups whilst the nipples $f^1$ are similarly connected to the rear milking cups. Assuming the parts to be in the position shown in Figure 7 and that pressure and suction have been established in the conduits $d$ and $e$, the cylinder $a$ is connected on one side of the piston $b$ through the tube $h^1$ ports $k^4$, $k^2$ and conduit $e$ to suction whilst on the other side of the piston $b$ the cylinder is connected to atmosphere through the tube $h$ and openings $i$. The piston therefore moves towards the right as seen in Figure 7 and as it reaches the end of its movement it pushes the tube $h^1$ outwardly of the cylinder, thus moving the openings $i^1$ through the stuffing box $h^1$ into communication with the atmosphere and at the same time shifting the slide $m$ from the position shown in Figure 7 to the opposite position (i. e. to the position at which it abuts the right hand end of the casing of the box $j$ as seen in Figure 7). In the new position of the slide $m$ the ports $k^4$ $k^2$ are out of register and the tube $h^1$ is disconnected from the suction conduit but the tube $h$ is connected to the suction conduit through the ports $k^3$ $k^1$ thus supplying suction to the cylinder $a$ at the left hand side of the piston as seen in Figure 7, the openings $i$ having been pushed through the stuffing box $h^1$ into the cylinder by the movement of the slide $m$. Thus the piston $b$ now moves in the opposite direction and as it reaches the end of its movement it pushes the tube $h$ outwardly of the cylinder and returns the parts to the position shown in Figure 7 whereupon the cycle of operation just described is repeated.

The slide $m$ is thus regularly reciprocated in the distribution box $j$ and the ports $x^1$, $x^2$, $z^1$, $z^2$, co-operate with the ports $l^1$, $l^2$, $y^1$, $y^2$ to distribute pressure and suction to the nipples $f$ and $f^1$ as hereinbefore described, so that periods during which the nipples $f$ (and therefore the front milking cups) are connected to pressure whilst the nipples $f^1$ (and therefore the rear milking cups) are connected to the suction alternate with periods during which the nipples $f^1$ are connected to pressure and the nipples $f$ to suction. The frequency of the alternations of pressure and suction can be controlled by the valves $w$ which regulate the speed of the piston $b$ and the apparatus can therefore be adjusted by the operator according to requirements.

For convenience in use the apparatus shown is provided with an additional suction conduit $g$ not connected to the conduits $d$ and $e$ which is utilised for supplying suction continuously to the flexible suction elements of the milking cups. The connections to the conduit $g$ form no part of the present invention and are therefore not described or shown.

I claim:—

1. Pressure and suction distributing mechanism for milking machines comprising a distribution box, connections on said distribution box for supplying compressed air and suction to the milking cups, a reciprocating slide in said distributing box, means controlled by said slide for delivering compressed air and suction alternately to each of said connections, a cyinder, a piston working in said cylinder, means controlled by said slide for supplying suction to said cylinder alternately on opposite sides of said piston and reciprocating tubes secured to said slide and projecting into said cylinder at opposite sides of said piston, said tubes also constituting the means for supplying suction to said cylinder.

2. Pressure and suction distributing mechanism for milking machines comprising a cylinder, a piston working in said cylinder, a distribution box, a reciprocating slide working in said distribution box, a cover on said distribution box, connections on said cover for connecting to the milking cups, pressure and suction ports in said distribution box, ports in said cover communicating with said connections, co-operating ports in said slide, tubes projecting slidably into said cylinder on either side of said piston, said tubes being secured to said slide and ports in said slide communicating with said tubes and each co-operating with one of said suction ports in said distribution box.

FRANZ REMY.